(12) United States Patent
Wang et al.

(10) Patent No.: US 11,172,214 B2
(45) Date of Patent: Nov. 9, 2021

(54) DERIVATION OF PROCESSING AREA FOR PARALLEL PROCESSING IN VIDEO CODING

(71) Applicant: QUALCOMM Incorporated, San Diego, CA (US)

(72) Inventors: Hongtao Wang, San Diego, CA (US); Yu Han, San Diego, CA (US); Vadim Seregin, San Diego, CA (US); Cheng-Teh Hsieh, Del Mar, CA (US); Wei-Jung Chien, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/721,204

(22) Filed: Dec. 19, 2019

(65) Prior Publication Data

US 2020/0204812 A1 Jun. 25, 2020

Related U.S. Application Data

(60) Provisional application No. 62/784,131, filed on Dec. 21, 2018.

(51) Int. Cl.
*H04N 19/436* (2014.01)
*H04N 19/119* (2014.01)
*H04N 19/139* (2014.01)
*H04N 19/176* (2014.01)
*H04N 19/172* (2014.01)

(52) U.S. Cl.
CPC ......... *H04N 19/436* (2014.11); *H04N 19/119* (2014.11); *H04N 19/139* (2014.11); *H04N 19/172* (2014.11); *H04N 19/176* (2014.11)

(58) Field of Classification Search
CPC .... H04N 19/436; H04N 19/52; H04N 19/105; H04N 19/119
See application file for complete search history.

(56) References Cited

U.S. PATENT DOCUMENTS

| 9,253,498 | B2 * | 2/2016 | Lee | H04N 19/51 |
| 9,554,150 | B2 * | 1/2017 | Zhang | H04N 19/70 |
| 9,621,888 | B2 * | 4/2017 | Jeon | H04N 19/43 |

(Continued)

OTHER PUBLICATIONS

CU-based Parallel Merge Mode; Lin—2012; (Year: 2012).*

(Continued)

*Primary Examiner* — Luis Perez-Fuentes
(74) *Attorney, Agent, or Firm* — Shumaker & Sieffert, P.A.

(57) ABSTRACT

A video coder may determine a partitioning of a current picture of the video data into a plurality of partition blocks. The video coder may determine a plurality of processing areas in a unit in the current picture having sizes, where an average size of all of the plurality of processing areas in the unit is greater than or equal to a parameter N, and where determining the plurality of processing areas in the unit includes defining a processing area of the plurality of processing areas that has a size that fits two or more adjacent partition blocks of the plurality of adjacent blocks. The video coder may independently code coding units (CUs) within the processing area having the merged two or more adjacent partition blocks.

30 Claims, 10 Drawing Sheets

(56) References Cited

U.S. PATENT DOCUMENTS

| | | | | |
|---|---|---|---|---|
| 9,674,527 | B2* | 6/2017 | Seregin | H04N 19/105 |
| 9,736,489 | B2* | 8/2017 | Wang | H04N 19/52 |
| 10,484,703 | B2* | 11/2019 | Chen | H04N 19/52 |
| 10,666,936 | B2* | 5/2020 | Lee | H04N 19/198 |
| 10,778,998 | B2* | 9/2020 | Takehara | H04N 19/105 |
| 2012/0257678 | A1* | 10/2012 | Zhou | H04N 19/172 |
| | | | | 375/240.16 |
| 2016/0241858 | A1* | 8/2016 | Li | H04N 19/176 |
| 2020/0204812 | A1* | 6/2020 | Wang | H04N 19/119 |

OTHER PUBLICATIONS

Parallel AMVP candidate list construction for hevc; Yu; 2016; (Year: 2016).*

Hardware-friendly Advanced Motion Vector Predictor for hevc; Park; 2018; (Year: 2018).*

Motion vector prediction methods considering prediction continuity in HEVC; 2016; (Year: 2016).*

Ahn Y-J., et al., "Implementation of Fast HEVC Encoder Based on SIMD and Data-level Parallelism," EURASIP Journal on Image and Video Processing, vol. 2014, No. 1, Jan. 1, 2014 (Jan. 1, 2014), p. 16, XP055215340, ISSNL: 1687-5281, DOI: 10.1186/1687-5281-2014-16, 19 pages, figure 2, section 2.

Bossen F., et al., "JEM Software Manual," Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.

Chen C-C., et al., "CE4-Related: Shared Merge List", 12. JVET Meeting; Oct. 3, 2018-Oct. 12, 2018; Macao; (The Joint Video Exploration Team of ISO/IEC JTC1/SC29/WG11 and ITU-T SG.16), No. JVET-L0091, Oct. 4, 2018 (Oct. 4, 2018), pp. 1-4, XP030194633, Retrieved from the Internet: URL:http://phenix.int-evry.fr/jvet/doc_end_user/documents/12_Macao/wg11/JVET-L0091-v4.zip JVET-L0091-v2_clean.docx [retrieved on Oct. 4, 2018]. abstract, section 2.

Chen J., et al., "Algorithm description for Versatile Video Coding and Test Model 1 (VTM 1)", Joint Video Exploration Team (JVET) of ITU-T SG 16 WP 3 and ISO/IEC JTC 1/SC 29/WG 11, 10th Meeting: San Diego, US, Apr. 10-20, 2018, Jun. 16, 2018, JVET-J1002-v2, 10 pages, XP030198635, http://phenix.int-evry.fr/jvet/doc_end_user/documents/10_SanDiego/wg11/JVET-J1002-v2.zip.

Chen J., et al., "Algorithm Description of Joint Exploration Test Model 1," 1, JVET Meeting; Oct. 19, 2015-Oct. 21, 2015; Geneva;(The Joint Video Exploration Team of ISO/IEC JTC1/SC29/WG11 and ITU-T SG.16 ); URL: http://phenix.int-evry.fr/jvet/,, No. JVET-A1001 Feb. 24, 2016 (Feb. 24, 2016), XP030150000, 27 pages.

IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.

International Search Report and Written Opinion—PCT/US2019/067993—ISA/EPO—dated Mar. 25, 2020 17 Pages.

Yang H., et al., "Description of Core Experiment 4 (CE4): Inter Prediction and Motion Vector Coding", 124. MPEG Meeting; Oct. 3, 2018-Oct. 12, 2018; Macao; (Motion Picture Expert Group or ISO/IEC JTC1/SC29/WG11), No. m45215, Nov. 3, 2018 (Nov. 3, 2018), 14 Pages, XP030215969, Retrieved from the Internet: URL:http://phenix.int-evry.fr/mpeg/doc_end_user/documents/124_Macao/wg11/m45215-JVET-L1024-v2-JVET-L1024.zip, JVET-L1024-v2.docx [retrieved on Nov. 3, 2018], p. 5, Paragraphs 3.1, 3.2, Section 2.3.2 to 2.3.4.

Bross B., et al., "Versatile Video Coding (Draft 6)", 127th MPEG and 15th JVET Meeting, Jul. 3, 2019-Jul. 12, 2019, Gothenburg, (Motion Picture Expert Group or JVET of ISO/IEC JTC1/SC29/WG11 and ITU-T SG 16 WP 3), No. m49908, JVET-O2001-vE, Jul. 15, 2019 (Jul. 15, 2019), XP030208562, 455 Pages, Retrieved from the Internet: URL: http://phenix.int-evry.fr/mpeg/doc_end_user/documents/127Gothenburg/wg11/m49908-JVET-O2001-v14-JVET-O2001-vE.zip, JVET-O2001-vE.docx [retrieved on Jul. 15, 2019]. pp. 203-222, Section 8.5.2.

ITU-T H.265, "Series H: Audiovisual and Multimedia Systems, Infrastructure of Audiovisual Services—Coding of Moving Video, High efficiency Video Coding", The International Telecommunication Union, Dec. 2016, 664 Pages. p. 154-161, Section 8.5.3.1 to Section 8.5.3.2.

Wang (QUALCOMM) H., et al., "CE4-Related: Hybrid Merge Estimation Region", 13th JVET Meeting, Jan. 9, 2019-Jan. 18, 2019, Marrakech, (The Joint Video Exploration Team of ISO/IEC JTC1/SC29/WG11 and ITU-TSG.16 ), No. JVET-M0507, Jan. 3, 2019 (Jan. 3, 2019), XP030200556, pp. 1-11, Retrieved from the Internet: URL: http://phenix.int-evry.fr/jvet/doc_end_user/documents/13_Marrakech/wg11/JVET-M0507-v1.zip JVET-M0507_DraftText.docx, [retrieved on Jan. 3, 2019].

* cited by examiner

DERIVATION OF PROCESSING AREA FOR PARALLEL PROCESSING IN VIDEO CODING

This application claims the benefit of U.S. Provisional Application No. 62/784,131, filed Dec. 21, 2018, which is hereby incorporated by reference in its entirety.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for selecting processing areas, such as merge estimation regions, for pictures of video data in a potentially more flexible manner. The techniques of this disclosure may enable different neighboring partition blocks to be combined together to form a processing area and may also loosen the restriction on the size of processing areas. For example, processing areas in a picture may not have to each be the same area size as defined by coding parameters of a video codec. Rather, the average size of the processing areas may be constrained to be larger than or equal to the area size defined by coding parameters. Accordingly, the techniques described herein may be able to achieve higher coding performance by increasing the capability of a video coder to encode or decode blocks in parallel.

In one example, a method for coding video data includes determining a partitioning of a current picture of the video data into a plurality of partition blocks. The method further includes determining a plurality of processing areas in a unit in the current picture having sizes, wherein an average size of all of the plurality of processing areas in the unit is greater than or equal to a parameter N, and wherein determining the plurality of processing areas in the unit includes defining a processing area of the plurality of processing areas that has a size that fits two or more adjacent partition blocks of the plurality of partition blocks. The method further includes independently coding coding units (CUs) within the processing area having the merged two or more adjacent partition blocks.

In another example, a video coding device includes a memory to store video data. The device further includes one or more processors implemented in circuitry and configured to: determine a partitioning of a current picture of the video data into a plurality of partition blocks; determine a plurality of processing areas in a unit in the current picture having sizes, wherein an average size of all of the plurality of processing areas in the unit is greater than or equal to a parameter N, and wherein determining the plurality of processing areas in the unit includes defining a processing area of the plurality of processing areas that has a size that fits two or more adjacent partition blocks of the plurality of partition blocks; and independently code coding units (CUs) within the processing area having the merged two or more adjacent partition blocks.

In another example, a device for coding video data includes means for determining a partitioning of a current picture of the video data into a plurality of partition blocks. The device further includes means for determining a plurality of processing areas in a unit in the current picture having sizes, wherein an average size of all of the plurality of processing areas in the unit is greater than or equal to a parameter N, and wherein the means for determining the plurality of processing areas in the unit includes means defining a processing area of the plurality of processing areas that has a size that fits two or more adjacent partition blocks of the plurality of partition blocks. The device further includes means for independently coding coding units (CUs) within the processing area having the merged two or more adjacent partition blocks.

In another example, a computer-readable storage medium having stored thereon instructions that, when executed, cause one or more processors configured to code video data to: determine a partitioning of a current picture of the video data into a plurality of partition blocks; determine a plurality of processing areas in a unit in the current picture having sizes, wherein an average size of all of the plurality of processing areas in the unit is greater than or equal to a parameter N, and wherein determining the plurality of processing areas in the unit includes defining a processing area of the plurality of processing areas that has a size that fits two or more adjacent partition blocks of the plurality of partition blocks; and independently code coding units (CUs) within the processing area having the merged two or more adjacent partition blocks.

The details of one or more examples are set forth in the accompanying drawings and the description below. Other features, objects, and advantages will be apparent from the description, drawings, and claims.

DETAILED DESCRIPTION

Figure 1:
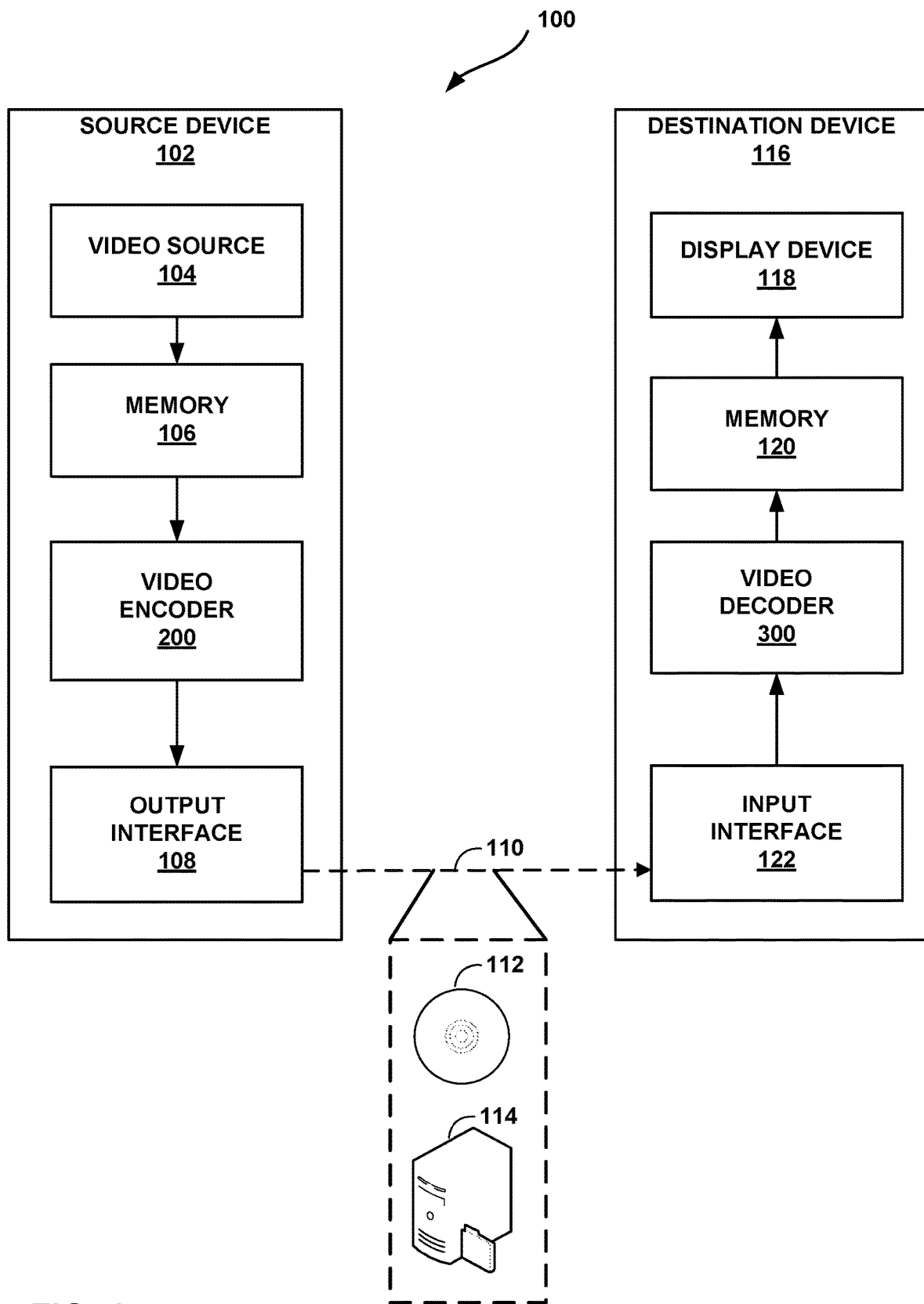
FIG. 1 is a block diagram illustrating an example video encoding and decoding system that may perform the techniques of this disclosure.

Aspects of the present disclosure describe techniques for selecting processing areas for pictures of video data in a way that increases the number of blocks in pictures of video data that may be processed in parallel. During the video coding process, a picture of video data may be partitioned into partition blocks, where each partition block is a portion of the picture. When the partition blocks are processed as part of the video coding process, dependencies between neighboring partition blocks may decrease the performance of the video coding process. The techniques of this disclosure may allow different partition blocks to be combined to form a processing area to resolve such dependencies between neighboring blocks to thereby increase the performance of the video coding process, and the techniques of this disclosure may also apply constraints to processing areas in a way that loosen one or more restrictions on the size of processing areas.

The way that a video coder derives candidate lists for blocks, such as merge candidate lists, may potentially introduce dependencies between neighboring blocks in a picture of video data because a neighboring block may be, for example, a merge candidate for another neighboring block. Due to such dependencies between neighboring blocks, a video coder may not necessarily be able to process neighboring blocks in parallel, thereby introducing a potential bottleneck in the video coding process. For example, a video coder may not be able to determine, for a block, whether a neighboring block is a merge candidate until motion data is available for the neighboring block, such that performing motion estimation for the block may be dependent upon determining motion data for the neighboring block.

A video coder may use the concept of a merge estimation region (MER) to reduce the local interdependency between small blocks and to thereby enable parallel merge candidate derivation for those blocks. A MER may indicate a region in which merge candidate lists can be independently derived for blocks within the region by checking whether a candidate block is in the same MER as a current block. If a candidate block is in the same MER as the current block, the candidate block is not included in the merge candidate list for the current block, so that the motion data for the candidate block does not need to be available at the time of constructing the merge candidate list for the current block. In this way, blocks within the same MER may be coded in parallel.

One example of a MER mechanism uses square MER grids (e.g., 4×4, 8×8, 16×16, 32×32, and 64×64 grids), and each MER may be required cover all coding units that overlap with the MER. However, such a MER mechanism may not be flexible enough for actual encoder/decoder design.

Another example of a MER mechanism uses area-based MER, may be more flexible than fixed square MER grids. In area-based MER, one specific size of N can be defined as an MER area, and once a coding tree unit is split to the size of N, a corresponding partition block of size N is considered as a MER, thereby allowing parallel processing of all coding units within the partition block. However, area-based MER may not be flexible enough to be applicable to the different ways in which a partition can be split, such as via quad-tree splitting, binary-tree splitting, ternary-tree splitting, and the like.

In particular, the boundaries of area-based MERs may not always be able to match partition boundaries of partition blocks. For example, if the size of an area-based MER is specified to be 32, and if a partition of size 64 is split into 4 sub-partitions each of size 16 via quad-tree splitting, there may be no partition block that can exactly match the MER block having a size of 32. Thus, the area of a MER may have to be properly selected in order to allow parallel processing inside the MER and to reduce the sacrifice of rate-distortion performance as much as possible.

Aspects of the present disclosure describes techniques to determine the sizes and shapes of processing areas, such as a MER, of a picture of video data in a way that is potentially more flexible than the approaches discussed above, thereby enabling greater performance gains in video coding by increasing the amount of parallel processing of partition blocks that may be performed. In some examples, the techniques include merging several adjacent partition blocks into a processing area if the processing area does not exactly match the boundary of a single partition block, and corresponding rules can be applied to all partition blocks within the processing area to enable parallel processing of the partition blocks within the processing area.

Further, in some examples, the techniques also include the sizes of processing areas to be different from an area size defined by a parameter N. Instead, processing areas within a unit may be constrained to have an average area size that is greater than or equal to the parameter N, so that individual processing areas may have sizes that are greater or less than the parameter N as long as the average area size is greater than or equal to the parameter N, thereby ensuring that parallel processing capabilities do not decrease due to such non-standard sized areas.

In accordance with aspects of the present disclosure, a video coder may determine a partitioning of a current picture of the video data into a plurality of partition blocks. The video coder may determine a plurality of processing areas in a unit in the current picture having sizes, wherein an average size of all of the plurality of processing areas in the unit is greater than or equal to a parameter N, and wherein determining the plurality of processing areas in the unit includes defining a processing area of the plurality of processing areas that has a size that fits two or more adjacent partition blocks of the plurality of partition blocks. The video coder may independently code coding units (CUs) within the processing area having the merged two or more adjacent partition blocks.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for deriving processing areas for parallel processing in video coding. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for deriving processing areas for parallel processing in video coding. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone, a set-top box, a broadcast receiver device, a mobile device, and the like.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 6)," Joint Video Experts Team (JVET) of ITU-T SG 16 WP 3 and ISO/IEC JTC 1/SC 29/WG 11, 15$^{th}$ Meeting: Gothenburg, SE, 3-12 Jul. 2019, JVET-O2001-vE (hereinafter "VVC Draft 6"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 and video decoder 300 code CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

As mentioned above, a video coder (e.g., video encoder 200 or video decoder 300) may apply inter prediction to generate a prediction block for a video block of a current picture. For instance, the video coder may apply inter prediction to generate a prediction block for a prediction block of a CU. If the video coder applies inter prediction to generate a prediction block, the video coder generates the prediction block based on decoded samples of one or more reference pictures. Typically, the reference pictures are pictures other than the current picture. In some video coding specifications, a video coder may also treat the current picture itself as a reference picture. The video coder may determine one or more reference picture lists. Each of the reference picture lists includes zero or more reference pictures. One of the reference picture lists may be referred to as Reference Picture List 0 (RefPicList0) and another reference picture list may be referred to as Reference Picture list 1 (RefPicList1).

The video coder may apply uni-directional inter prediction or bi-directional inter prediction to generate a prediction block. When the video coder applies uni-directional inter prediction to generate a prediction block for a video block, the video coder determines a single reference block for the video block based on a samples of a single reference picture. The reference block may be a block of samples that is similar to the prediction block. Furthermore, when the video coder applies uni-directional inter prediction, the video coder may set the prediction block equal to the reference block. When the video coder applies bi-directional inter prediction to generate a prediction block for a video block, the video coder determines two reference blocks for the video block. In some examples, the two reference blocks are in reference pictures in different reference picture lists. Additionally, when the video coder applies bi-direction inter-prediction, the video coder may determine the prediction block based on the two reference blocks. For instance, the video coder may determine the prediction block such that each sample of the prediction block is a weighted average of corresponding samples of the two reference blocks. Reference list indicators may be used to indicate which of the reference picture lists include reference pictures used for determining reference blocks.

As mentioned above, a video coder may determine a reference block based on samples of a reference picture. In some examples, the video coder may determine the reference block such that each sample of the reference block is equal to a sample of the reference picture. In some examples, as part of determining a reference block, the video coder may interpolate samples of the reference block from samples of the reference picture. For example, the video coder may determine that a sample of the prediction block is a weighted average of two or more samples of the reference picture.

In some examples, when video encoder 200 performs uni-directional inter prediction for a current block of a current picture, video encoder 200 identifies a reference block within one or more reference pictures in one of the reference picture lists. For instance, video encoder 200 may search for a reference block within the one or more reference pictures in the reference picture list. In some examples, video encoder 200 uses a mean squared error or other metric to determine the similarity between the reference block and the current block Furthermore, video encoder 200 may determine motion parameters for the current block. The motion parameters for the current block may include a motion vector and a reference index. The motion vector may indicate a spatial displacement between a position of the current block within the current picture and a position of the reference block within the reference picture. The reference index indicates a position within the reference picture list of the reference frame that contains the reference picture list. The prediction block for the current block may be equal to the reference block.

When video encoder 200 performs bi-directional inter prediction for a current block of a current picture, video encoder 200 may identify a first reference block within reference pictures in a first reference picture list ("list 0") and may identify a second reference block within reference pictures in a second reference picture list ("list 1"). For instance, video encoder 200 may search for the first and second reference blocks within the reference pictures in the first and second reference picture lists, respectively. Video encoder 200 may generate, based at least in part on the first and the second reference blocks, the prediction block for the current block. In addition, video encoder 200 may generate a first motion vector that indicates a spatial displacement between the current block and the first reference block. Video encoder 200 may also generate a first reference index that identifies a location within the first reference picture list of the reference picture that contains the first reference block. Furthermore, video encoder 200 may generate a second motion vector that indicates a spatial displacement between the current block and the second reference block. Video encoder 200 may also generate a second reference index that identifies a location within the second reference picture list of the reference picture that includes the second reference block.

When video encoder 200 performs uni-directional inter prediction on a current block, video decoder 300 may use the motion parameters of the current block to identify the reference block of the current block. Video decoder 300 may then generate the prediction block of the current block based on the reference block. When video encoder 200 performs bi-directional inter prediction to determine a prediction block for a current block, video decoder 300 may use the motion parameters of the current block to determine two reference blocks. Video decoder 300 may generate the prediction block of the current block based on the two reference samples of the current block.

Video encoder 200 may signal motion parameters of a block in various ways. Such motion parameters may include motion vectors, reference indexes, reference picture list indicators, and/or other data related to motion. In some examples, video encoder 200 and video decoder 300 may use motion prediction to reduce the amount of data used for signaling motion parameters. Motion prediction may comprise the determination of motion parameters of a block (e.g., a PU, a CU, etc.) based on motion parameters of one or more other blocks. There are various types of motion prediction. For instance, merge mode and advanced motion vector prediction (AMVP) mode are two types of motion prediction.

In merge mode, video encoder 200 generates a candidate list. The candidate list includes a set of candidates that indicate the motion parameters of one or more source blocks. The source blocks may spatially or temporally neighbor a current block. Furthermore, in merge mode, video encoder 200 may select a candidate from the candidate list and may use the motion parameters indicated by the selected candidate as the motion parameters of the current block. Video encoder 200 may signal the position in the candidate list of the selected candidate. Video decoder 300 may determine, based on information obtained from a bitstream, the index into the candidate list. In addition, video decoder 300 may generate the same candidate list and may determine, based on the index, the selected candidate. Video decoder 300 may then use the motion parameters of the selected candidate to generate a prediction block for the current block.

Skip mode is similar to merge mode. In skip mode, video encoder 200 and video decoder 300 generate and use a candidate list in the same way that video encoder 200 and video decoder 300 use the candidate list in merge mode. However, when video encoder 200 signals the motion parameters of a current block using skip mode, video encoder 200 does not signal any residual data for the current block. Accordingly, video decoder 300 may determine a prediction block for the current block based on one or more reference blocks indicated by the motion parameters of a selected candidate in the candidate list. Video decoder 30 may then reconstruct samples in a coding block of the current block such that the reconstructed samples are equal to corresponding samples in the prediction block of the current block.

AMVP mode is similar to merge mode in that video encoder 200 may generate a candidate list for a current block and may select a candidate from the candidate list. However, for each respective reference block used in determining a prediction block for the current block, video encoder 200 may signal a respective motion vector difference (MVD) for the current block, a respective reference index for the current block, and a respective candidate index indicating a selected candidate in the candidate list. An MVD for a block may indicate a difference between a motion vector of the block and a motion vector of the selected candidate. The reference index for the current block indicates a reference picture from which a reference block is determined.

Furthermore, when AMVP mode is used, for each respective reference block used in determining a prediction block for the current block, video decoder 300 may determine an MVD for the current block, a reference index for the current block, and a candidate index and a motion vector prediction (MVP) flag. Video decoder 300 may generate the same candidate list and may determine, based on the candidate index, a selected candidate in the candidate list. As before, this candidate list may include motion vectors of neighboring blocks that are associated with the same reference index as well as a temporal motion vector predictor which is derived based on the motion parameters of the neighboring block of the co-located block in a temporal reference picture. Video decoder 300 may recover a motion vector of the current block by adding the MVD to the motion vector indicated by the selected AMVP candidate. That is, video decoder 300 may determine, based on a motion vector indicated by the selected AMVP candidate and the MVD, the motion vector of the current block. Video decoder 300 may then use the recovered motion vector or motion vectors of the current block to generate prediction blocks for the current block.

When a video coder (e.g., video encoder 200 or video decoder 300) generates an AMVP candidate list for a current block, the video coder may derive one or more AMVP candidates based on the motion parameters of reference blocks (e.g., spatially-neighboring blocks) that contain locations that spatially neighbor the current PU and one or more AMVP candidates based on motion parameters of PUs that temporally neighbor the current PU. The candidate list may include motion vectors of reference blocks that are associated with the same reference index as well as a temporal motion vector predictor which is derived based on the motion parameters (i.e., motion parameters) of the neighboring block of the co-located block in a temporal reference picture. A candidate in a merge candidate list or an AMVP candidate list that is based on the motion parameters of a reference block that temporally neighbors a current block. This disclosure may use the term "temporal motion vector predictor" to refer to a block that is in a different time instance than the current block and is used for motion vector prediction.

In HEVC, the concept of merge estimation region (MER) are introduced to reduce the local interdependency between small blocks so that parallel merge candidate derivation for those blocks is allowed. The MER mechanism adopted by HEVC uses fixed square MER grids. Each MER must cover all CUs that overlaps with the MER, thus the MER mechanism is not flexible enough for actual encoder/decoder design.

Area-based MER is more flexible, one specific size of N can be defined as MER area and once a coding tree unit is split to the size of N, the corresponding partition block is considered as MER and parallel processing of all CUs within the partition block is allowed. However, the area-based MER has a problem in that the way to split a coding tree unit (CTU) can be very flexible. For example, in versatile video coding (VVC), some different kinds of splitting such as quad-tree partitioning, binary-tree partitioning, and ternary-tree partitioning are allowed. In quad-tree partitioning, a block is split into four sub-blocks. In binary-tree partitioning, a block is split into two sub-blocks. In ternary-tree partitioning, a block is split into three sub-blocks.

Area based MER boundaries may not always be partition boundaries. For example, in the example of FIG. 8, MER size is specified to 32 but the partition of size 64 is split into 4 sub-partitions of size 16 via a quad-tree splitting. Then, there is no partition block that can exactly match the MER block. The MER area needs to be properly selected to allow parallel processing inside MER and reduce the sacrifice of rate-distortion performance as much as possible.

This disclosure describes techniques to determine a processing area based on the parameter N. In some examples, if the processing area cannot fit exactly to the boundary of a partition block, several adjacent partition blocks may be merged to the processing area and corresponding rules can be applied to all CUs within the area so that parallel processing is allowed. In one example, a parameter N is defined as the number of samples included in the processing area. In another example the parameter N is defined as the number of minimum CU block sizes covered by the processing area. In this example, if the parameter N has a value of 16, and if the minimum CU block size is 4×4, then the processing area may be a block having a size of 16×16. There may be alternative definitions of parameter N to which the techniques of this disclosure are still applicable.

The process for defining the processing area can be applied to MER, shared candidate list (in which all CUs within a processing area share the same merge candidate list), and can be applied to other tools such as AMVP, affine mode, etc. In one example, such tools are the tools that require deriving a candidate list based on neighbor information.

Based on the condition of block partitioning, the final processing area size may be different from the area size defined by the parameter N, and therefore be a non-standard sized processing area. One example rule that may be applied to those non-standard sized processing areas to guarantee the parallel capability of processing does not decrease due to the non-standard sized areas: All processing areas have an average area size that is greater than or equal to N. As a few examples, the unit which has average area size no less than the defined area can be a picture, a slice, a tile, a CTU, a partition block of size 2*N or other predefined regions.

In one example, to accomplish the rule in cases when size of processing area does not fit the partitioning, one processing area can be defined larger than a desired area defined by the parameter N, and next processing area is defined as being smaller than the desired area. In such case, average size of processing areas is not decreased, and parallel processing capability is maintained. How the larger and smaller areas are defined may depend on the partition type.

Some examples of the techniques of this disclosure can be as follows.

Figure 5A:
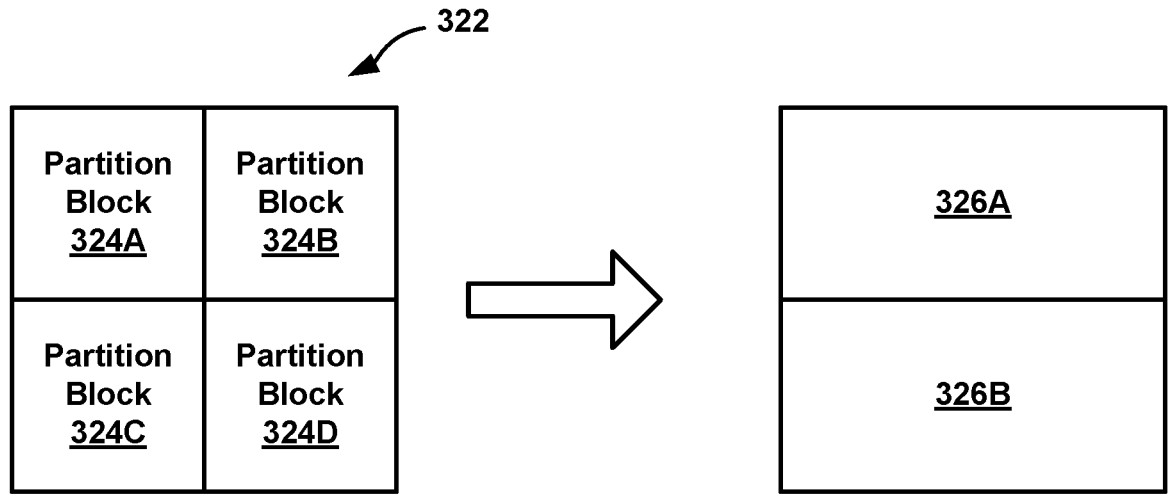
FIGS. 5A-5B are conceptual diagrams illustrating determining processing areas for partition blocks generated from quad-tree splitting.
Figure 5B:
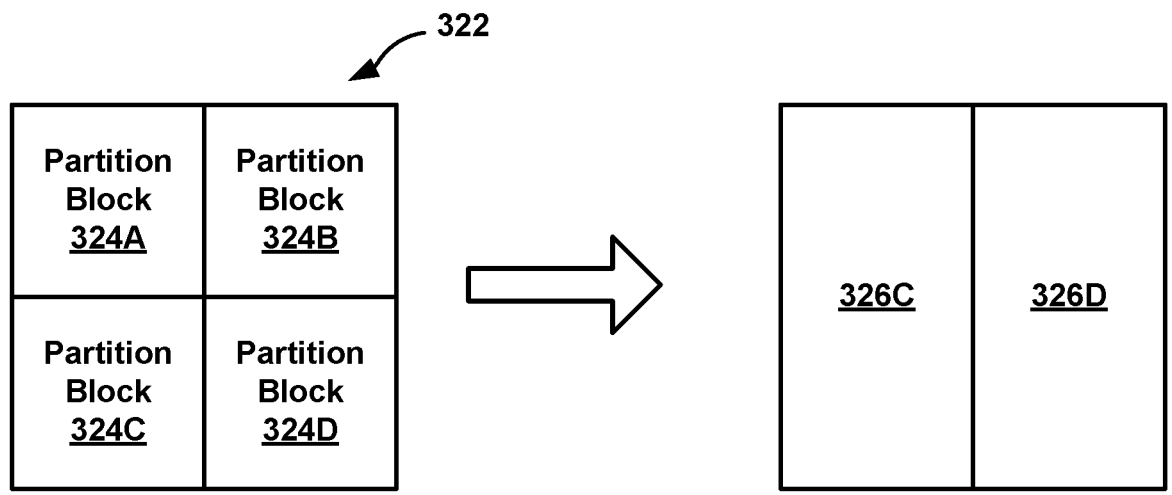

For example, for a quad-tree splitting, processing area sizes can be specified as 32 samples, 64 samples, 128 samples, 256 samples, etc. When the total partition size is 2*N (the 4 sub-partitions are all of size N/2), the processing area size may be defined as N. A rectangular area which includes or consists of 2 horizontally adjacent sub-partitions can be treated as the first processing area. As another example, a rectangular area including or consisting of 2 vertically adjacent sub-partitions can be treated as the first processing area. The second rectangular partition is treated as the second processing area. The processing areas for the two examples mentioned in this paragraph are shown in FIG. 5A and FIG. 5B.

Figure 7A:
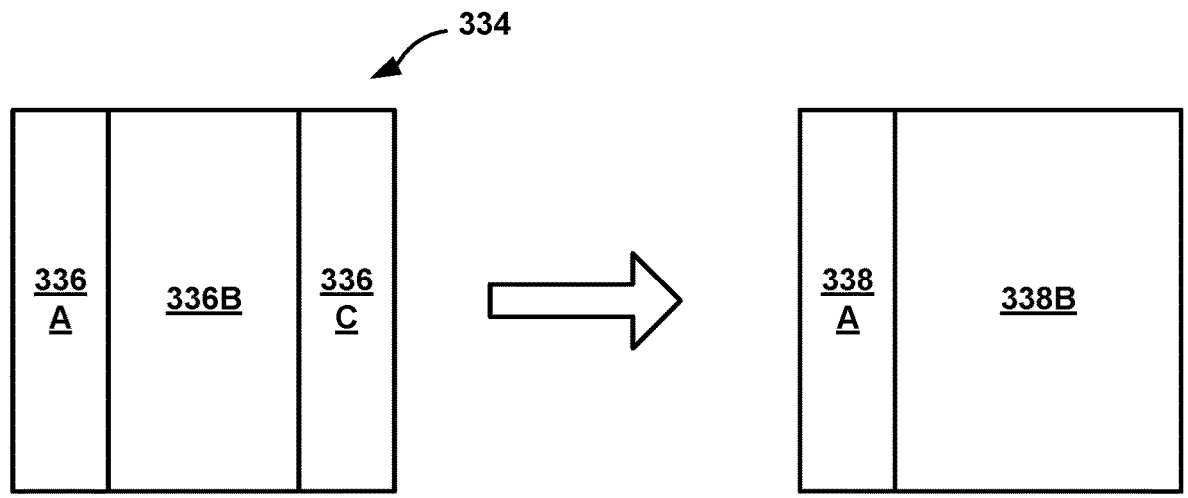
FIGS. 7A-7B are conceptual diagrams illustrating determining processing areas for partition blocks generated from vertical ternary-tree splitting.
Figure 7B:
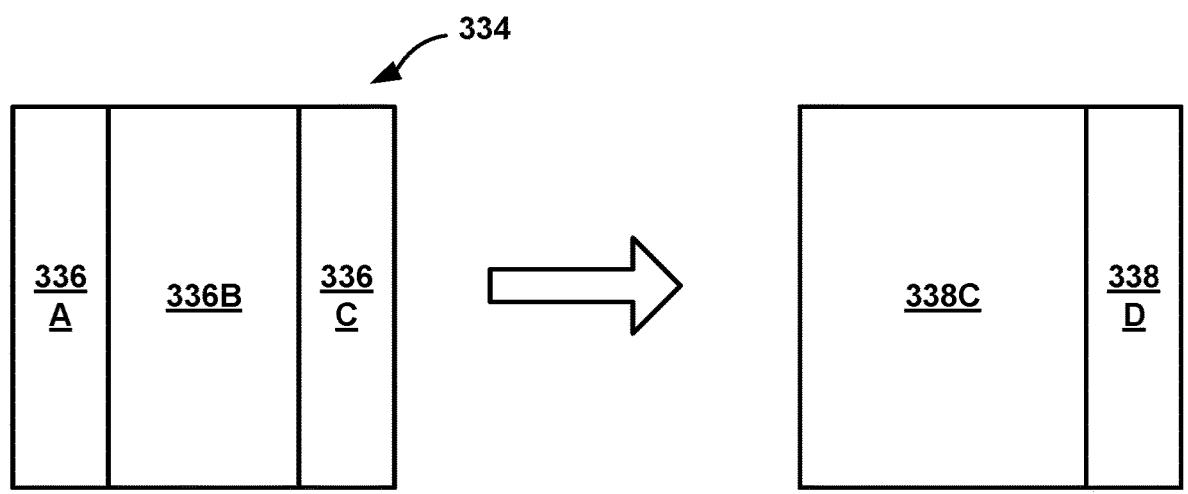

For another example, for horizontal ternary-tree splitting, the size of processing area can be specified as 32 samples, 64 samples, 128 samples, 256 samples, etc. When the total partition size is 2*N and the 3 sub-partitions are of size N/2, N and N/2, the center sub-partition is combined with the left sub-partition to form the first processing area and the right sub-partition is treated as the second processing area. In this example, the 2 areas corresponding to the 2*N sized partition block are guaranteed to have an average size of N. As another example, the center sub-partition is combined with the right sub-partition to form the first processing area and the left sub-partition is the second processing area. In this example, the two areas corresponding to the 2*N sized partition block are also guaranteed to have an average size of N. The processing areas for the two examples mentioned in this paragraph are shown in FIG. 7A and FIG. 7B.

Figure 6A:
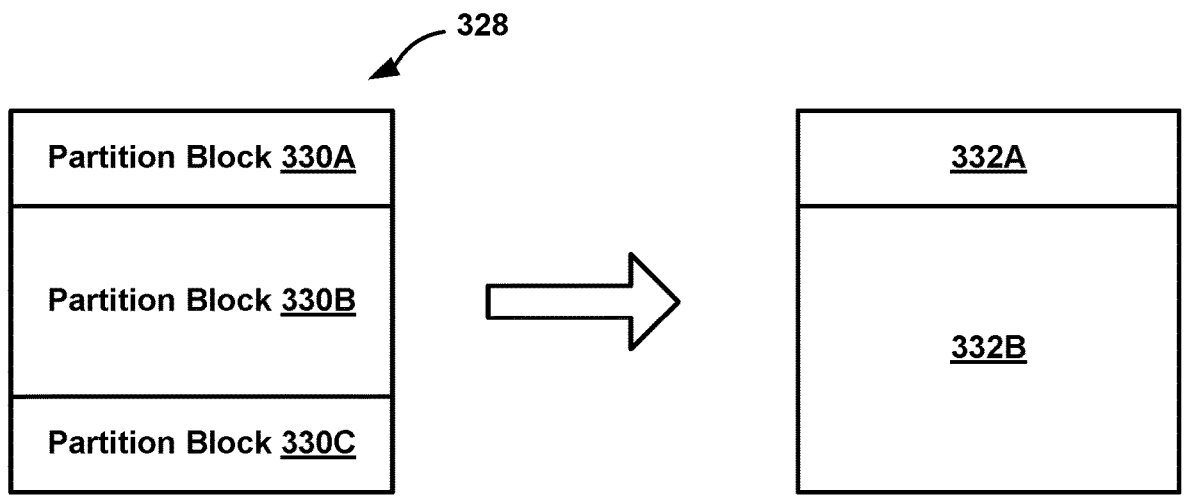
FIGS. 6A-6B are conceptual diagrams illustrating determining processing areas for partition blocks generated from horizontal ternary-tree splitting.
Figure 6B:
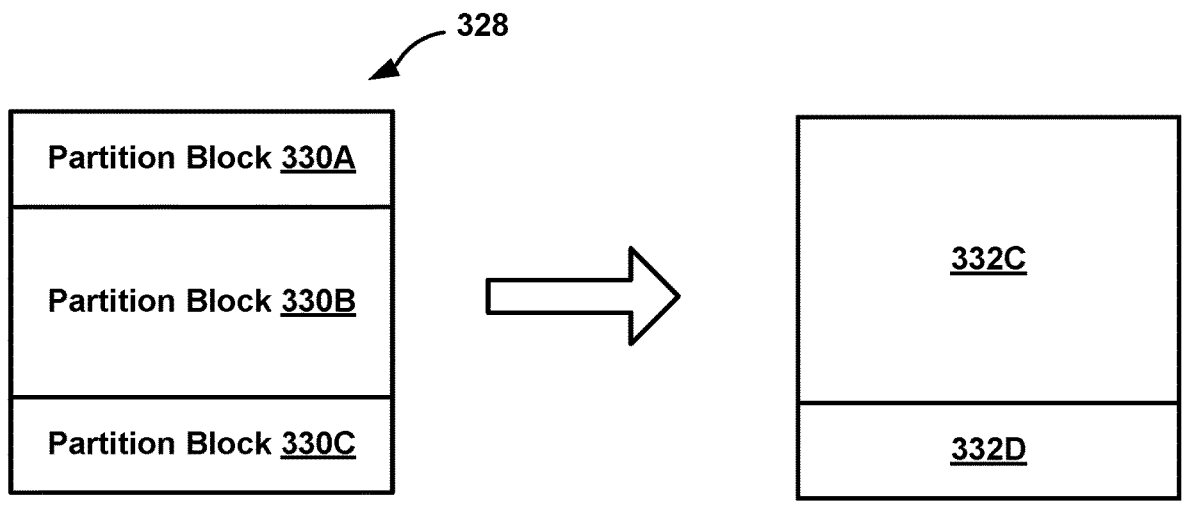

For another example, vertical ternary-tree splitting is used. The processing area sizes can be specified as 32 samples, 64 samples, 128 samples, 256 samples, etc. When the total partition size is 2*N and the 3 sub-partitions are of size N/4, N/2 and N/4. The center sub-partition is combined with the top sub-partition to form the first processing area and the bottom sub-partition is treated as the second processing area. In this example, the two processing areas corresponding to the 2*N sized partition block are guaranteed to have an average size of N. As another example, the center sub-partition is combined with the bottom sub-partition to form the first processing area and the top sub-partition is the second processing area. In this example, the two processing areas corresponding to the 2*N sized partition block are also guaranteed to have an average size of N. The processing areas for the two examples mentioned in the paragraph are shown in FIG. 6A and FIG. 6B.

Similar method can be applied to any other partition types. For example, when a partitions of size 2*N is split into four horizontal sub-partitions each of size N/2, or is split into four vertical sub-partitions each of size N/2, two processing areas each of size N may each combine two of the four sub-partitions. Alternatively, one processing area of size 3N/2 may combine three adjacent sub-partitions to form the processing area while another processing area of size N/2 may contain the remaining sub-partition.

There may be a case when a candidate in a shared candidate list is derived from the bottom-right corner of the processing area. In one example, such candidate can be a temporal motion vector predictor (TMVP). In other words, a video coder may derive a temporal motion vector predictor based on motion parameters of a reference block, where the reference block is in a reference picture and covers a location within the reference picture that is collocated with a location immediately below and right of the bottom-right corner of the processing area. However, some parts of the processing area can be located outside of a picture boundary. In this case, the bottom-right block (i.e., a reference block collocated with a location immediately below and right of the bottom-right corner of the processing area) may not be available. In this case, the center of the processing area can be used to derive the candidate. In other words, a video coder may derive a temporal motion vector predictor based on motion parameters of a reference block, where the reference block is in a reference picture and covers a location within the reference picture that is collocated with a center location of the processing area. However, the techniques for using the center of the processing area to derive the candidate may be different from temporal motion vector prediction in HEVC. For example, a video coder may need to check whether the center location of the processing area is located within the picture boundaries, and if the center location is outside of the picture boundaries then such candidate (e.g., a TMVP) is not available. The center location is used as an example, and any other location within the processing area can be used instead. In the HEVC case, a block always fits the picture boundary and a center block is always located within the picture boundaries.

In accordance with the techniques of this disclosure, a video coder such as video encoder 200 or video decoder 300 shown in FIG. 1, may determine a partitioning of a current picture of the video data into a plurality of partition blocks. The video coder may determine a plurality of processing areas in a unit in the current picture having sizes, wherein an average size of all of the plurality of processing areas in the unit is greater than or equal to a parameter N, and wherein determining the plurality of processing areas in the unit includes defining a processing area of the plurality of processing areas that has a size that fits two or more adjacent partition blocks of the plurality of partition blocks. The video coder may independently code coding units (CUs) within the processing area having the merged two or more adjacent partition blocks.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
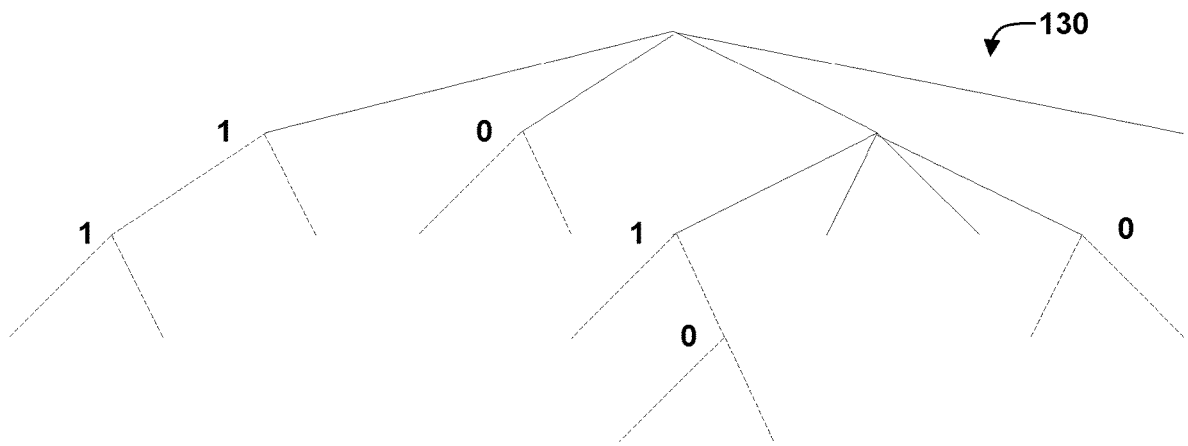
FIGS. 2A and 2B are conceptual diagrams illustrating an example quadtree binary tree (QTBT) structure, and a corresponding coding tree unit (CTU).
Figure 2B:
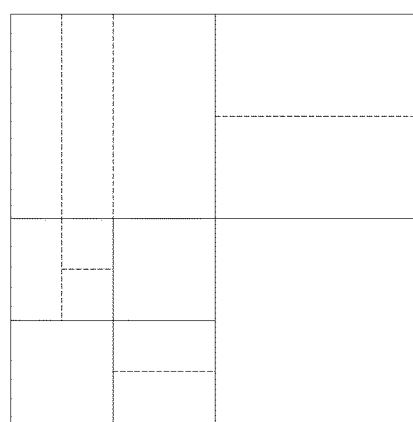

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, the leaf quadtree node will not be further split by the binary tree, because the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has a width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 3:
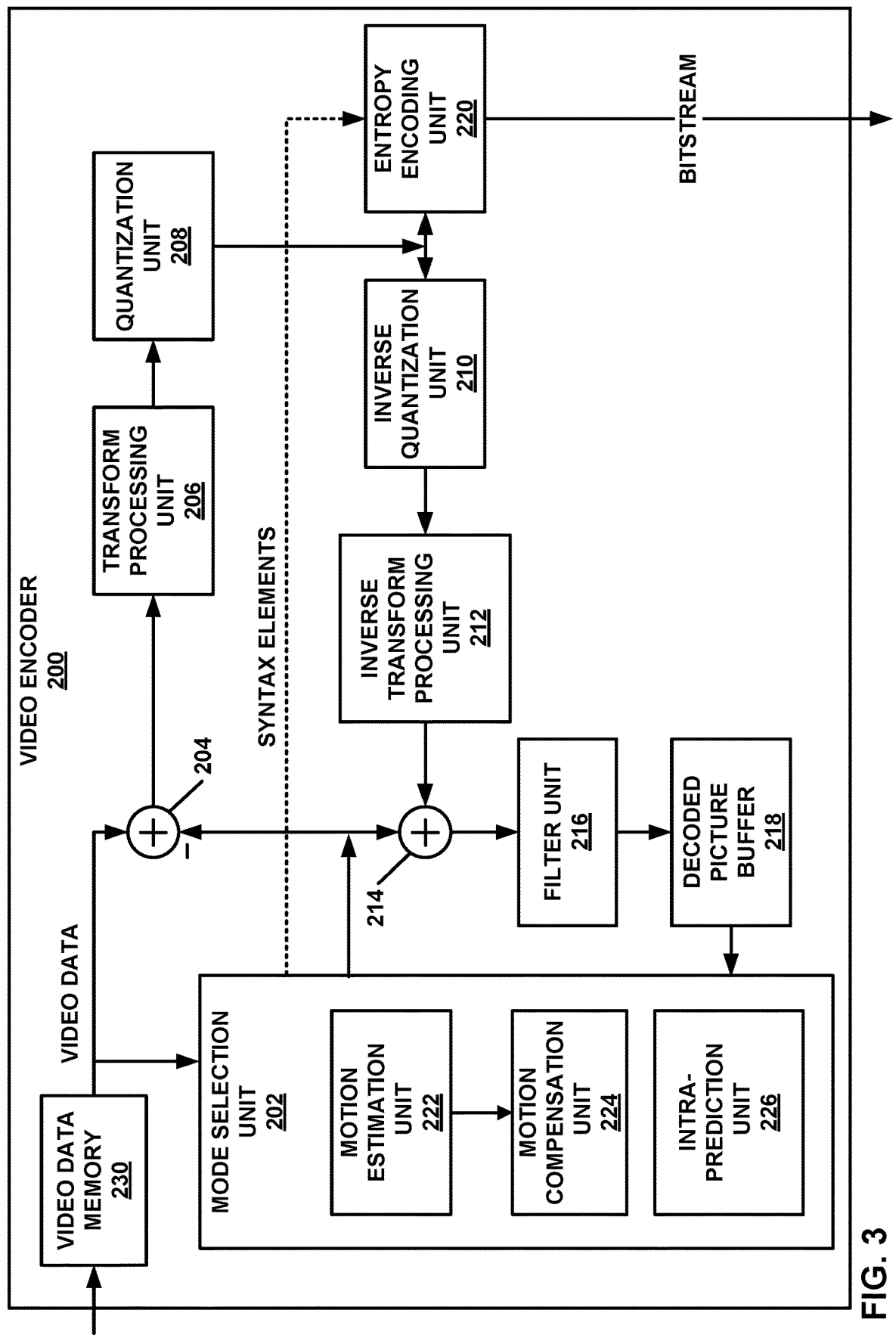
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

As part of determining motion vectors for blocks, motion estimation unit 222 may construct merge candidate lists for blocks. Construction merge candidate lists for blocks may potentially introduce dependencies between neighboring blocks in a picture of video data because a neighboring block may be a merge candidate for another neighboring block. Due to such dependencies between neighboring blocks, merge candidate lists of neighboring blocks may not necessarily be able to be generated in parallel, and may therefore introduce a bottleneck in the video coding process. As such, HEVC introduced the concept of merge estimation region (MER) to reduce the local interdependency between small blocks to enable parallel merge candidate derivation for those blocks.

A MER may indicate a region in which merge candidate lists can be independently derived for blocks within the MER by checking whether a candidate block is located in the same MER as a current block. If a candidate block is in in the same MER as the current block, the candidate block is not included in the merge candidate list for the current block, so that the motion data for the candidate block does not need to be available at the time of constructing the merge candidate list for the current block. By grouping blocks of a picture into MERs, motion estimation unit 222 may be able to independently determine merge candidate lists for blocks within the same MER, thereby allowing motion estimation unit 222 to determine merge candidate lists for blocks within the same MER in parallel or in a pipelined fashion.

Aspects of the present disclosure describes techniques to determine the sizes and shapes of processing areas, such as MERs, in a picture of video data in a way that increases the amount of parallel processing of partition blocks that may be performed by components of video encoder 200, such as motion estimation unit 222. In some examples, the techniques include motion estimation unit 222 merging several adjacent partition blocks into a processing area (e.g., a MER) if the processing area does not exactly match the boundary of a single partition block, and applying corresponding rules to each partition block within the processing area, thereby enabling motion estimation unit 222 to independently process each the partition blocks within the processing area, such as independently determine motion data (e.g., a merge candidate list) for each of the partition blocks without dependencies between partition blocks within the same processing area.

By enabling motion estimation unit 222 to independently process partition blocks within a processing area, estimation unit 222 may be able to process the partition blocks within the processing area in parallel or in a pipelined fashion. For example, motion estimation unit 222 may be able to independently determine motion vectors for partition blocks within the same processing area, so that motion estimation unit 222 may be able to determine motion vectors for partition blocks within the same processing area in parallel.

In accordance with aspects of the present disclosure, mode selection unit 202 of video encoder 200 may determine a partitioning of a current picture of the video data into a plurality of partition blocks. For example, as discussed above, mode selection unit 202 may partition CTUs into CUs for a current picture of the video data in a number of ways, such as according to one or more of: a ternary tree, a quad tree, or a binary tree.

Motion estimation unit 222 may determine the number of processing areas for a unit in the current picture of video data as well as the sizes and shapes of such processing areas in a way that is able to handle the flexible ways of partitioning CUTs and CUs while optimizing the encoding performance as well as the encoding efficiency of video encoder 200. As such, motion estimation unit 222 may determine a plurality of processing areas in a unit in the current picture having sizes, wherein that an average size of all of the plurality of processing areas in the unit is greater than or equal to a parameter N. Such processing areas may, for example, be MERs.

A unit in the current picture may be the current picture itself, a slice, a tile, a coding tree unit (CTU), or a partition block of size 2*N. In one example, the parameter N may be defined as the number of samples included in a processing area, and exemplary values for the parameter N may be, for example, 32, 64, 128, 256, and the like.

Motion estimation unit 222 or other components of video encoder 200 may determine the value of parameter N based on a video codec of the video data or via any other suitable techniques. For example, motion estimation unit 222 may determine the value of parameter N based on the number of partition blocks in the unit, the sizes of partition blocks in the unit, and the like as well as factors such as encoder performance, coding efficiency, and the like. In one example, if a unit is a CTU, then the CTU's size may be 2*N, so that the value of parameter N may be half the size of the CTU. In some examples, motion estimation unit 222 may determine different values for parameter N for different video data, different pictures of the same video data, different video codecs, and the like.

As long as the average area size of processing areas within a unit of the video data is greater than or equal to the parameter N, individual processing areas that follow such a constraint within the unit may have different sizes and different shapes from each other. For example, in cases when size of a processing area does not fit the partitioning of blocks, a processing area can be defined larger than the desired area size defined by the parameter N, and the next processing area can be defined as being smaller than the desired area size. By applying such a constraint to processing areas in a unit, the average size of processing areas in a unit is not increased, and motion estimation unit 222 is able to maintain its parallel processing capability to process blocks that are within the same processing area.

In some examples, processing areas within the unit may include square-shaped processing areas, non-square shaped processing areas, or a combination of square processing areas and non-square (i.e., rectangular) processing areas. Further, processing areas within the unit may have a mix of sizes that are greater than, less than, or equal to the parameter N. By constraining the processing areas within a unit in such a fashion, motion estimation unit 222 may ensure that its capabilities to independently process partition blocks within individual processing areas, such as processing partition blocks in the same processing area in parallel, do not decrease due to such non-standard sized processing areas.

As part of determining the plurality of processing areas in the unit, motion estimation unit 222 may, based define a processing area of the plurality of processing areas that has a size that fits two or more adjacent partition blocks of the plurality of partition blocks. As discussed above, motion estimation unit 222 may determine, based at least in part on factors such as the partition blocks in the unit, the number of processing areas in the unit as well as the sizes and shapes of the processing areas in the unit. Motion estimation unit 222 may therefore determine whether the processing areas in the unit fit the partition boundaries of the partition blocks and to merge two or more adjacent partition blocks into a processing area so that the processing area fits the boundaries of the merged two or more adjacent partition blocks. For example, the processing area may be square or non-square and may be the same size and shape as the total size of the two or more adjacent partition blocks that are merged into the processing area, so that the two or more adjacent partition blocks of the plurality of partition blocks fits the size of the processing area.

Motion estimation unit 222 may independently encode coding units (CUs) within the processing area having the merged two or more adjacent partition blocks. Independently encoding CUs within the processing area may include motion estimation unit 222 being able to encode individual CUs within the processing area without depending on the result of decoding other CUs in the same processing area, such that motion estimation unit 222 is able to encode adjacent individual CUs at the same time. This is opposed to examples where, without use of a MER, the coding of motion parameters for a CU cannot occur at the same time as that of a neighboring CU because coding the motion parameters for the CU depends on the result of coding motion parameters for the neighboring CU. For example, because blocks within the same processing area are not merge candidates for other blocks in the same processing area, motion estimation unit 222 is able to determine the motion parameters for a CU in the processing area, such as a merge candidate list for the CU, as part of encoding the motion parameters for the CU without having to wait for the motion data for an adjacent CU to be determined.

In this way, motion estimation unit 222 may be able to encode CUs within the same processing area in parallel. For example, motion estimation unit 222 may be able to determine motion parameters for each of the CUs within the same processing area in parallel. In some examples, motion estimation unit 222 may use a shared merge candidate list for all CUs within the same processing area to determine motion parameters for the CUs in parallel. By using a shared merge candidate list for all CUs within the same processing area, each CU in the same processing area may use the same merge candidate list for determining motion parameters instead of determining different merge candidate lists used by different CUs in the same processing area. Thus, using a shared merge candidate list for all CUs within the same processing area may reduce the processing that may be required to determine motion parameters for CUs in the same processing area, thereby improving coding efficiency of video encoder 200. Similarly, in other examples, motion estimation unit 222 may perform advanced motion vector prediction (AMVP) or affine motion prediction for CUs within the same processing area in parallel to determine motion parameters for the CUs within the same processing area in parallel.

In some examples, a portion of a processing area may be outside the picture boundary of a picture of video data. Thus, to determine whether a block is a merge candidate, motion estimation unit 222 may determine whether the block is located outside the picture boundary of the picture and, if so, determine that the block is not available as a merge candidate.

For example, motion estimation unit 222 may determine a temporal motion vector prediction (TMVP) candidate based on a block of a reference picture that is collocated with a block at the right-bottom corner of a processing area. However, because a portion of a processing area can be located outside of a picture boundary, it may be the case that the block at the right-bottom corner of a processing area is not available for TMVP determination if it is located outside of the picture boundary. In this case, if motion estimation unit 222 determines that the right-bottom corner of the processing area is located outside the picture boundary, motion estimation unit 222 may determine that the block is not available for TMVP determination.

Instead, motion estimation unit 222 may determine if a block of a reference picture that is collocated with the center of the processing area is available to be used to derive the TMVP candidate. Motion estimation unit 222 may determine whether the center of the processing area is located within the picture boundary and, if so, may use the block of the reference picture that is collocated with the center of the processing area to derive the TMVP candidate. However, because it is also possible that the center of the processing area is located outside of the picture boundary, if motion estimation unit 222 determines that the center of the processing area is located outside of the picture boundary, then motion estimation unit 222 may determine that the center of the processing area is also not available for use to derive the TMVP candidate.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to determine a partitioning of a current picture of the video data into a plurality of partition blocks, determine a plurality of processing areas for a unit in the current picture having sizes that meet a constraint that an average size of all of the plurality of processing areas in the unit is greater than or equal to a parameter N, based on a processing area of the plurality of processing areas having a size not fitting one or more boundaries of the partition blocks, merge two or more adjacent partition blocks of the plurality of partition blocks into the processing area, and independently encode coding units (CUs) within the processing area having the merged two or more adjacent partition blocks.

Figure 4:
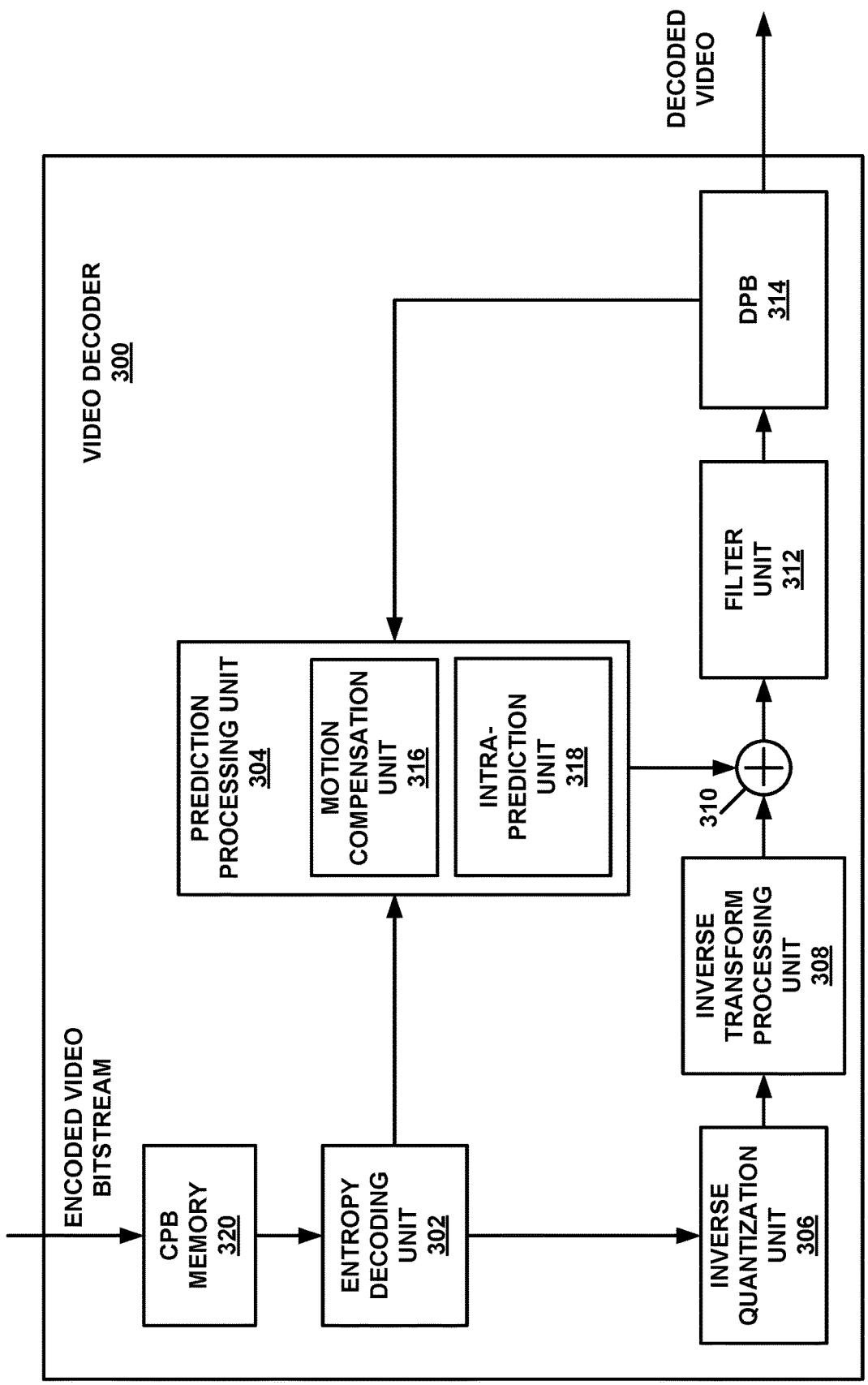
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of JEM, VVC, and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, of FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to decode a bitstream into video data.

FIGS. 5A-5B are conceptual diagrams illustrating determining processing areas for partition blocks generated from quad-tree splitting. As shown in FIGS. 5A and 5B, partition 322, such as a CTU, may be a unit in a picture, and is split according to a quad-tree splitting into partition blocks 324A-324D. When the size of partition 322 is 2*N, the four partition blocks 324A-324D may each have a size of N/2. Accordingly, a video coder such as video encoder 200 or video decoder 300 may determine the size of processing areas for partition blocks 324A-324D to be N.

In the example of FIG. 5A, the video coder may determine the processing areas 326A and 326B for partition blocks 324A-324D to be rectangular areas that each includes two horizontally adjacent sub-partitions of partition 322. For example, processing area 326A may include horizontally adjacent partition blocks 324A and 324B, and processing area 326B may include horizontally adjacent partition blocks 324C and 324D. Because processing area 326A and processing area 326B each has a size N, the average size of all of the plurality of processing areas in the unit that corresponds to partition 322 is also N, which meets the constraint of the average size of all of the plurality of processing areas in the unit being greater than or equal to N.

In the example of FIG. 5B, the video coder may determine the processing areas 326C and 326D for partition blocks 324A-324D to be rectangular areas that each includes two vertically adjacent sub-partitions of partition 322. For example, processing area 326C may include horizontally adjacent partition blocks 324A and 324C, and processing area 326D may include horizontally adjacent partition blocks 324B and 324D. Because processing area 326C and processing area 326D each has a size N, the average size of all of the plurality of processing areas in the unit that corresponds to partition 322 is also N, which meets the constraint of the average size of all of the plurality of processing areas in the unit being greater than or equal to N.

FIGS. 6A-6B are conceptual diagrams illustrating determining processing areas for partition blocks generated from horizontal ternary-tree splitting. As shown in FIGS. 6A and 6B, partition 328, such as a CTU, may be a unit in a picture, and is split according to a horizontal ternary-tree splitting into partition blocks 330A-330C. The size of partition 328 may be 2*N. The size of partition block 330A may be N/2, the size of partition block 330B may be N, and the size of partition block 330C may be N/2.

In the example of FIG. 6A, the video coder may determine the processing areas 332A and 332B for partition blocks 330A-330C to be rectangular areas that are different in size from each other. Processing area 332A may be of size 1/2N and include partition block 330A, while processing area 332B may be of size 3N/2 and include partition blocks 330B and 330C. Because two processing areas 332A and 332B together fit the boundaries of partition 328 of size 2*N, the average size of the two processing areas 332A and 332B in the unit that corresponds to partition 328 is N, which meets the constraint of the average size of all processing areas in the unit being greater than or equal to N.

In the example of FIG. 6B, the video coder may determine the processing areas 332C and 332D for partition blocks 330A-330C to be rectangular areas that are different in size from each other. Processing area 332C may be of size 3/2N and include partition blocks 330A and 330B, while processing area 332D may be of size N/2 and include partition block 330C. Because two processing areas 332C and 332D together fit the boundaries of partition 328 of size 2*N, the average size of the two processing areas 332C and 332D in the unit that corresponds to partition 328 is N, which meets the constraint of the average size of all processing areas in the unit being greater than or equal to N.

FIGS. 7A-7B are conceptual diagrams illustrating determining processing areas for partition blocks generated from vertical ternary-tree splitting. As shown in FIGS. 7A and 7B, partition 334, such as a CTU, may be a unit in a picture, and is split according to a vertical ternary-tree splitting into partition blocks 336A-336C. The size of partition 334 may be 2*N. The size of partition block 336A may be N/2, the size of partition block 336B may be N, and the size of partition block 336C may be N/2.

In the example of FIG. 7A, the video coder may determine the processing areas 338A and 338B for partition blocks 336A-336C to be rectangular areas that are different in size from each other. Processing area 338A may be of size 1/2N and include partition block 336A, while processing area 338B may be of size 3N/2 and include partition blocks 336B and 336C. Because two processing areas 338A and 338B together fit the boundaries of partition 334 of size 2*N, the average size of the two processing areas 338A and 338B in the unit that corresponds to partition 334 is N, which meets the constraint of the average size of all processing areas in the unit being greater than or equal to N.

In the example of FIG. 7B, the video coder may determine the processing areas 338C and 338D for partition blocks 336A-336C to be rectangular areas that are different in size from each other. Processing area 338C may be of size 3/2N and include partition blocks 336A and 336B, while processing area 338D may be of size N/2 and include partition block 336C. Because two processing areas 338C and 338D together fit the boundaries of partition 334 of size 2*N, the average size of the two processing areas 338C and 338D in the unit that corresponds to partition 334 is N, which meets the constraint of the average size of all processing areas in the unit being greater than or equal to N.

Figure 8:
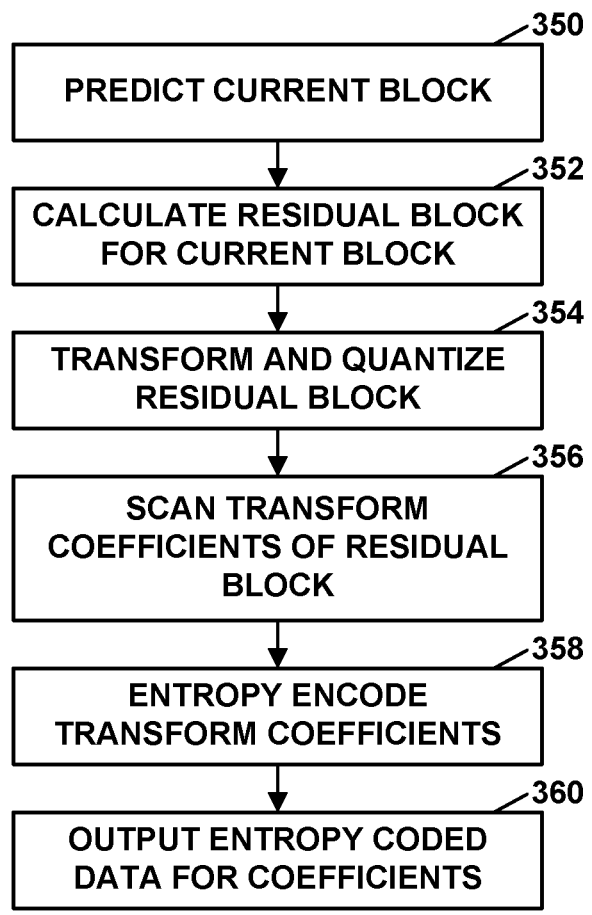
FIG. 8 is a flowchart illustrating an example method for encoding a current block.

FIG. 8 is a flowchart illustrating an example method for encoding a current block. The current block may comprise a current CU. Although described with respect to video encoder 200 (FIGS. 1 and 3), it should be understood that other devices may be configured to perform a method similar to that of FIG. 8.

In this example, video encoder 200 initially predicts the current block (350). For example, video encoder 200 may form a prediction block for the current block. As part of forming the prediction block for the current block, video encoder 200 may determine motion parameters for the current block. To enable the motion parameters for the current block to be determined in parallel with other adjacent blocks, video encoder 200 may determine a plurality of processing areas in a unit in the current picture of video data having sizes, where the average size of all of the processing areas in the unit is greater than a parameter N, including defining a processing area that has a size that fits the current block and one or more adjacent blocks, thereby merging the current block and the one or more adjacent blocks into a processing area, such as a MER. Video encoder 200 may thereby determine motion parameters for each of the blocks merged into the processing area, including the current block, in parallel.

Video encoder 200 may then calculate a residual block for the current block (352). To calculate the residual block, video encoder 200 may calculate a difference between the original, unencoded block and the prediction block for the current block. Video encoder 200 may then transform and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 9:
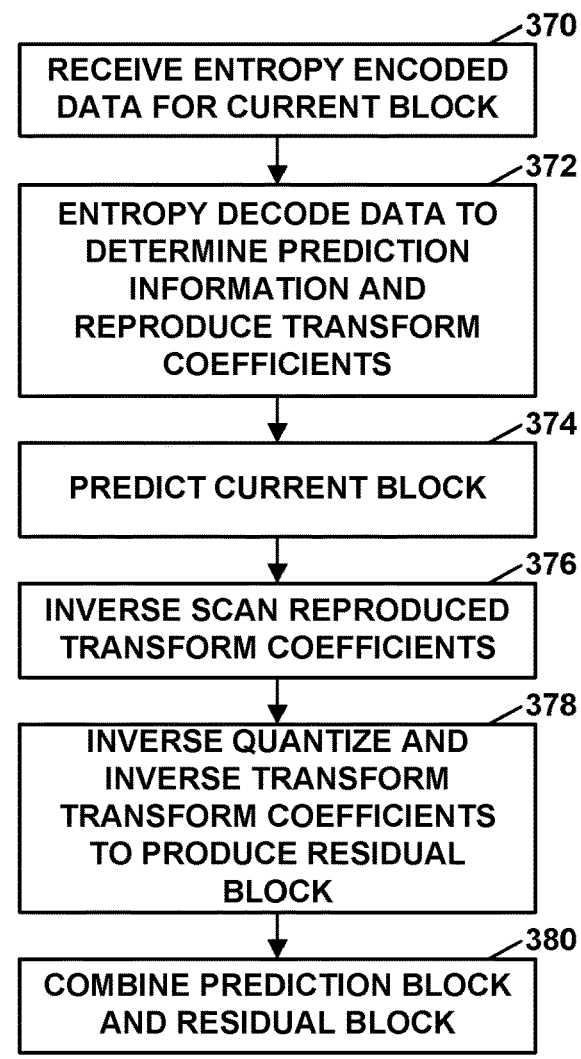
FIG. 9 is a flowchart illustrating an example method for decoding a current block of video data.

FIG. 9 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 9.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. As part of using inter-prediction mode for the current block to calculate a prediction block for the current block, video decoder 300 may determine motion parameters for the current block. To enable the motion parameters for the current block to be determined in parallel with other adjacent blocks, video decoder 300 may determine a plurality of processing areas in a unit in the current picture of video data having sizes, where the average size of all of the processing areas in the unit is greater than a parameter N, including defining a processing area that has a size that fits the current block and one or more adjacent blocks, thereby merging the current block and the one or more adjacent blocks into a processing area, such as a MER. For example, the plurality of processing areas may be in the encoded entropy data. Video decoder 300 may thereby determine motion parameters for each of the blocks merged into the processing area, including the current block, in parallel.

Video decoder 300 may then inverse scan the reproduced transform coefficients (376), to create a block of quantized transform coefficients. Video decoder 300 may then inverse quantize and inverse transform the transform coefficients to produce a residual block (378). Video decoder 300 may ultimately decode the current block by combining the prediction block and the residual block (380).

Figure 10:
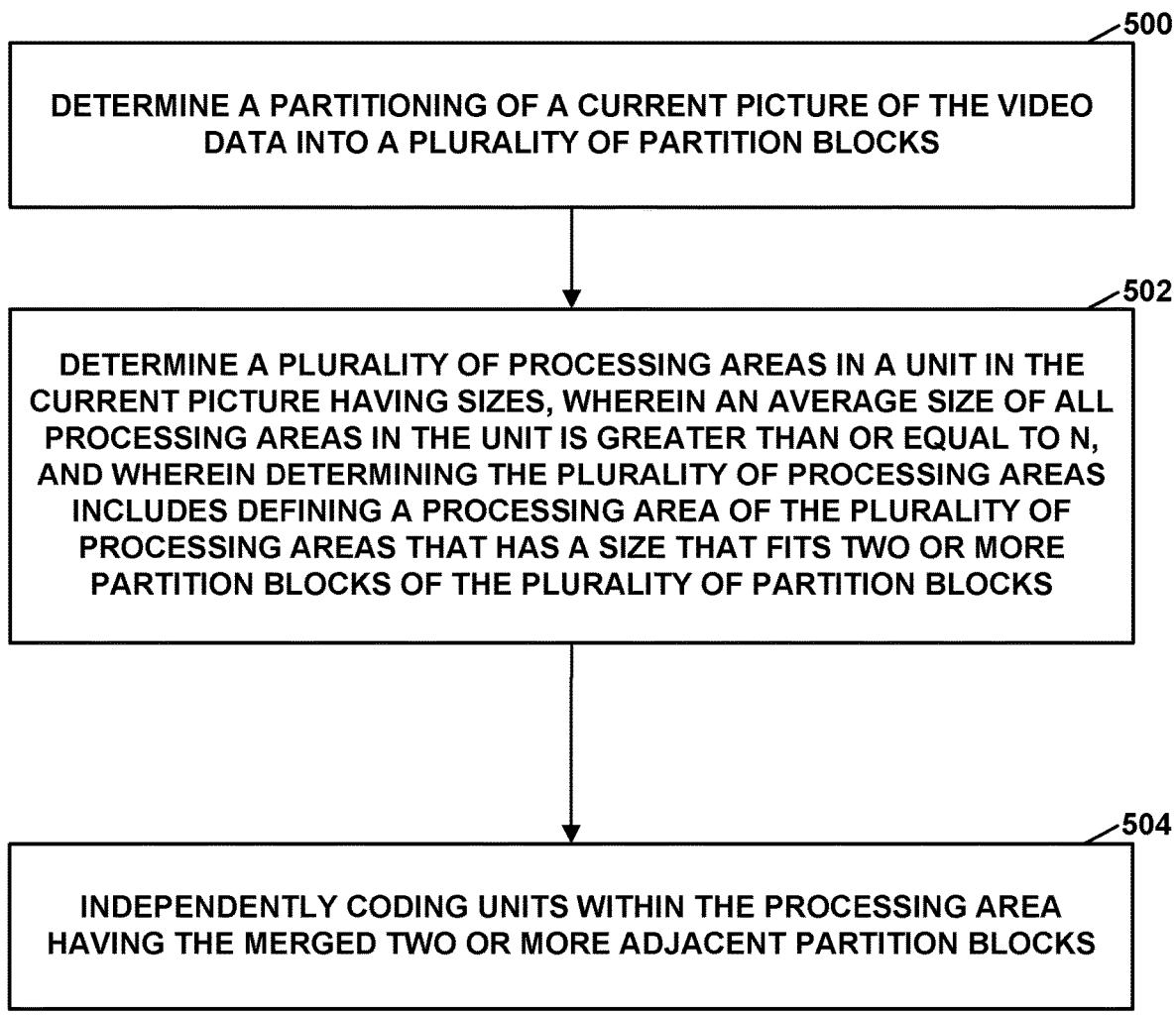
FIG. 10 is a flowchart illustrating an example method for deriving a processing area for parallel processing in video coding.

FIG. 10 is a flowchart illustrating an example method for deriving a processing area for parallel processing in video coding. As shown in FIG. 10, a video coder such as video encoder 200 or video decoder 300, may determine a partitioning of a current picture of the video data into a plurality of partition blocks (500). For example, the video coder may partition a CTU into CUs and may, in some examples, determine the partitioning of the current picture according to one or more of: a ternary tree, a quad tree, or a binary tree.

The video coder may determine a plurality of processing areas in a unit in the current picture having sizes, where an average size of all of the plurality of processing areas in the unit is greater than or equal to a parameter N, and where determining the plurality of processing areas in the unit includes defining a processing area of the plurality of processing areas that has a size that fits two or more adjacent partition blocks of the plurality of partition blocks (502). For example, the video coder may determine, based on the number, size, and/or shape of partition blocks, the number, size, and/or shape of processing areas that covers the processing area, such as to reduce the sacrifice of rate-distortion performance as much as possible.

In some examples, the parameter N specifies the number of samples included in one processing area and, in some examples, the unit is one of: the current picture, a slice, a tile, a CTU, or a partition block of size 2*N.

Further, in some examples, the processing area is a first processing area of the plurality of processing areas, and a size of the first processing area of the plurality of processing areas is different from a size of a second processing area of the plurality of processing areas. For example, the size of the first processing area of the plurality of processing areas may be larger than the parameter N, and the size of the second processing area of the plurality of processing areas is smaller than the parameter N, such as shown in the examples of FIGS. 6A, 6B, 7A, and 7B.

The video coder may independently code CUs within the processing area having the merged two or more adjacent partition blocks (504). As discussed above, the video coder may be video encoder 200 or video decoder 300. As such, in some examples, video encoder 200 may independently encode CUs within the processing area having the merged two or more adjacent partition blocks, and in other examples video decoder 300 may independently decode CUs within the processing area having the merged two or more adjacent partition blocks.

In some examples, the processing area is a merge estimation region, and the video coder independently coding the CUs within the processing area includes the video coder determining motion parameters for each of the CUs within the processing area in parallel. As discussed above, coding the CUs in parallel does not mean that CUs in the processing areas are coded at exactly the same time such that the video coder starts and ends coding of the CUs at the exact same time. Instead, coding the CUs in parallel includes video coders being able to perform the coding of the CUs at the same time.

In some examples, the processing area is a merge estimation region, and the video coder independently coding the CUs within the processing area includes the video coder using a shared merge candidate list for all CUs within the processing area to determine motion parameters for the CUs in parallel. By using a shared merged candidate list for all CUs within the same processing area, the video coder does not have to determine different merge candidate lists for different CUs in the same processing area, thereby improving the performance of the video coder in coding the CUs.

In some examples, the video coder independently coding the CUs within the processing area includes the video coder performing, in parallel, at least one of: advanced motion vector prediction (AMVP) for the CUs within the processing area, which sets certain constrains on the motion vector prediction candidates for the CUs based on the characteristics and availability of spatial motion prediction candidates, and/or affine motion prediction for the CUs within the processing area, which uses motion vectors of an affine motion model of neighboring block(s) to derive motion vector prediction candidates for a current block, to determine motion parameters for the CUs.

Illustrative examples of the disclosure include:

Example 1: A method of coding video data, the method comprising: determining a partitioning of a current picture of the video data into a plurality of partition blocks; based on a processing area having a standard size not fitting one or more boundaries of the partition blocks, merging two or more adjacent partition blocks of the plurality of partition blocks into the processing area; and coding units (CUs) within the processing area having the merged two or more adjacent partition blocks in parallel.

Example 2: A method according to Example 1, wherein the standard size is defined by a parameter N that specifies the number of samples to be included in the processing area.

Example 3: A method according to Example 2, wherein all processing areas of a unit have an average area greater than or equal to a parameter N.

Example 4: A method according to Example 3, wherein the unit is one of: the current picture, a slice, a tile, a coding tree unit (CTU), or a partition block of size 2*N.

Example 5: A method according to of any of Examples 1-4, wherein partitioning the block comprises partitioning the block according to a ternary tree.

Example 6: A method according to any of Examples 1-4, wherein partitioning the block comprises partitioning the block according to a quad tree.

Example 7: A method according to any of Examples 1-4, wherein partitioning the block comprises partitioning the block according to a binary tree.

Example 8: A method according to Examples 1-4, wherein the processing area is a merge estimation region and coding the CUs within the processing area in parallel comprises using a shared merge candidate list for all of the CUs within the processing area to determine motion parameters in parallel.

Example 9: A method according to any of Examples 1-8, wherein coding the CUs within the processing area in parallel comprises performing advanced motion vector prediction (AMVP) or affine motion prediction all of the CUs within the processing area to determine motion parameters in parallel.

Example 10: A method according to any of Examples 1-9, wherein coding comprises decoding.

Example 11: A method according to any of Examples 1-9, wherein coding comprises encoding.

Example 12: A device for coding video data, the device comprising one or more means for performing the method of any of Examples 1-11.

Example 13: A device according to Example 12, wherein the one or more means comprise one or more processors implemented in circuitry.

Example 14: A device according to any of Examples 12 and 13, further comprising a memory to store the video data.

Example 15: A device according to any of Examples 12-14, further comprising a display configured to display decoded video data.

Example 16: A device according to any of Examples 12-15, wherein the device comprises one or more of a camera, a computer, a mobile device, a broadcast receiver device, or a set-top box.

Example 17: A device according to of any of Examples 12-16, wherein the device comprises a video decoder.

Example 18: A device according to any of Examples 12-17, wherein the device comprises a video encoder.

Example 19: A computer-readable storage medium having stored thereon instructions that, when executed, cause one or more processors to perform the method of any of Examples 1-11.

Example 20: A device for encoding video data, the device comprising means for performing the methods of any of Examples 1-11.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
   determining a partitioning of a current picture of the video data into a plurality of partition blocks;
   determining a plurality of processing areas in a unit in the current picture having sizes, wherein an average size of all of the plurality of processing areas in the unit is greater than or equal to a parameter N, and wherein determining the plurality of processing areas in the unit includes defining a processing area of the plurality of processing areas that merges two or more adjacent partition blocks of the plurality of partition blocks, the processing area indicating that motion parameters can be independently derived for blocks within the two or more partition blocks covered by the processing area; and
   based on the processing area indicating that the motion parameters can be independently derived for the blocks within the two or more partition blocks covered by the processing area, independently coding coding units (CUs) within the processing area having the merged two or more adjacent partition blocks, including determining, in parallel, a first one or more motion parameters for a first CU in a first partition block of the two or more partition blocks and a second one or more motion parameters for a second CU in a second partition block of the two or more partition blocks.

2. The method of claim 1, wherein the parameter N specifies the number of samples included in one processing area.

3. The method of claim 1, wherein the processing area is a first processing area of the plurality of processing areas, and wherein a size of the first processing area of the plurality of processing areas is different from a size of a second processing area of the plurality of processing areas.

4. The method of claim 3, wherein the size of the first processing area of the plurality of processing areas is larger than the parameter N, and wherein the size of the second processing area of the plurality of processing areas is smaller than the parameter N.

5. The method of claim 1, wherein the unit is one of: the current picture, a slice, a tile, a coding tree unit (CTU), or a partition block of size 2*N.

6. The method of claim 1, wherein determining the partitioning of the current picture comprises determining the partitioning of the current picture according to one or more of: a ternary tree, a quad tree, or a binary tree.

7. The method of claim 1, wherein:
   the processing area is a merge estimation region; and
   independently coding the CUs within the processing area comprises determining the motion parameters for each of the CUs within the processing area in parallel.

8. The method of claim 1, wherein:
   the processing area is a merge estimation region; and
   independently coding the CUs within the processing area comprises using a shared merge candidate list for all CUs within the processing area to determine the motion parameters for the CUs in parallel.

9. The method of claim 1, wherein independently coding the CUs within the processing area comprises performing, in parallel, at least one of: advanced motion vector prediction (AMVP) for the CUs within the processing area or affine motion prediction for the CUs within the processing area to determine the motion parameters for the CUs.

10. The method of claim 1, wherein the coding comprises decoding.

11. The method of claim 1, wherein the coding comprises encoding.

12. A video coding device, the device comprising:
    a memory to store video data; and
    one or more processors implemented in circuitry and configured to:
      determine a partitioning of a current picture of the video data into a plurality of partition blocks;
      determine a plurality of processing areas in a unit in the current picture having sizes, wherein an average size of all of the plurality of processing areas in the unit is greater than or equal to a parameter N, and wherein determining the plurality of processing areas in the unit further includes defining a processing area of the plurality of processing areas that merges two or more adjacent partition blocks of the plurality of partition blocks, the processing area indicating that motion parameters can be independently derived for blocks within the two or more partition blocks covered by the processing area; and
      based on the processing area indicating that the motion parameters can be independently derived for the blocks within the two or more partition blocks covered by the processing area, independently code coding units (CUs) within the processing area having the merged two or more adjacent partition blocks, including determining, in parallel, a first one or more motion parameters for a first CU in a first partition block of the two or more partition blocks and a second one or more motion parameters for a second CU in a second partition block of the two or more partition blocks.

13. The device of claim 12, wherein the parameter N specifies the number of samples included in one processing area.

14. The device of claim 12, wherein the processing area is a first processing area of the plurality of processing areas, and wherein a size of the first processing area of the plurality of processing areas is different from a size of a second processing area of the plurality of processing areas.

15. The device of claim 14, wherein the size of the first processing area of the plurality of processing areas is larger than the parameter N, and wherein the size of the second processing area of the plurality of processing areas is smaller than the parameter N.

16. The device of claim 12, wherein the unit is one of: the current picture, a slice, a tile, a coding tree unit (CTU), or a partition block of size 2*N.

17. The device of claim 12, wherein the one or more processors configured to determine the partitioning of the current picture are further configured to partition the current picture according to one of: a ternary tree, a quad tree, or a binary tree.

18. The device of claim 12, wherein the one or more processors configured to determine the partitioning of the current picture are further configured to determine the partitioning of the current picture according to one or more of: a ternary tree, a quad tree, or a binary tree.

19. The device of claim 12, wherein:
the processing area is a merge estimation region; and
the one or more processors configured to independently code the CUs within the processing area are further configured to use a shared merge candidate list for all CUs within the processing area to determine the motion parameters for the CUs in parallel.

20. The device of claim 12, wherein the one or more processors configured to independently code the CUs within the processing area are further configured to perform, in parallel, at least one of: advanced motion vector prediction (AMVP) for the CUs within the processing area or affine motion prediction for the CUs within the processing area to determine the motion parameters for the CUs.

21. The device of claim 12, wherein the video coding device comprises a video decoding device, and wherein the one or more processors are further configured to independently decode the CUs within the processing area having the merged two or more adjacent partition blocks.

22. The device of claim 12, wherein the video coding device comprises a video encoding device, and wherein the one or more processors are further configured to encode, in parallel, the CUs within the processing area having the merged two or more adjacent partition blocks.

23. The device of claim 12, further comprising a display configured to display decoded video data.

24. The device of claim 12, wherein the device comprises one or more of a camera, a computer, a mobile device, a broadcast receiver device, or a set-top box.

25. An apparatus for coding video data, the apparatus comprising:
means for determining a partitioning of a current picture of the video data into a plurality of partition blocks;
means for determining a plurality of processing areas in a unit in the current picture having sizes, wherein an average size of all of the plurality of processing areas in the unit is greater than or equal to a parameter N, and wherein the means for determining the plurality of processing areas in the unit includes means for defining a processing area of the plurality of processing areas that merges two or more adjacent partition blocks of the plurality of partition blocks, the processing area indicating that motion parameters can be independently derived for blocks within the two or more partition blocks covered by the processing area; and
means for, based on the processing area indicating that the motion parameters can be independently derived for the blocks within the two or more partition blocks covered by the processing area, independently coding coding units (CUs) within the processing area having the merged two or more adjacent partition blocks, including means for determining, in parallel, a first one or more motion parameters for a first CU in a first partition block of the two or more partition blocks and a second one or more motion parameters for a second CU in a second partition block of the two or more partition blocks.

26. The apparatus of claim 25, wherein the parameter N specifies the number of samples included in one processing area.

27. The apparatus of claim 25, wherein the processing area is a first processing area of the plurality of processing areas, and wherein a size of the first processing area of the plurality of processing areas is different from a size of a second processing area of the plurality of processing areas.

28. The apparatus of claim 27, wherein the size of the first processing area of the plurality of processing areas is larger than the parameter N, and wherein the size of the second processing area of the plurality of processing areas is smaller than the parameter N.

29. The apparatus of claim 25, wherein:
the processing area is a merge estimation region; and
the means for independently coding the CUs within the processing area comprises means for determining the motion parameters for each of the CUs within the processing area in parallel.

30. A non-transitory computer-readable storage medium having stored thereon instructions that, when executed, cause one or more processors configured to code video data to:
determine a partitioning of a current picture of the video data into a plurality of partition blocks;
determine a plurality of processing areas in a unit in the current picture having sizes, wherein an average size of all of the plurality of processing areas in the unit is greater than or equal to a parameter N, and wherein determining the plurality of processing areas in the unit includes defining a processing area of the plurality of processing areas that merges two or more adjacent partition blocks of the plurality of partition blocks, the processing area indicating that motion parameters can be independently derived for blocks within the two or more partition blocks covered by the processing area; and
based on the processing area indicating that the motion parameters can be independently derived for the blocks within the two or more partition blocks covered by the processing area, independently code coding units (CUs) within the processing area having the merged two or more adjacent partition blocks, including determining, in parallel, a first one or more motion parameters for a first CU in a first partition block of the two or more partition blocks and a second one or more motion parameters for a second CU in a second partition block of the two or more partition blocks.

* * * * *